(12) United States Patent
Sugimoto

(10) Patent No.: US 11,480,125 B2
(45) Date of Patent: Oct. 25, 2022

(54) MISFIRE DETECTION DEVICE FOR INTERNAL COMBUSTION ENGINE

(71) Applicant: TOYOTA JIDOSHA KABUSHIKI KAISHA, Toyota (JP)

(72) Inventor: Hitoki Sugimoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/547,758

(22) Filed: Dec. 10, 2021

(65) Prior Publication Data
US 2022/0243677 A1    Aug. 4, 2022

(30) Foreign Application Priority Data

Jan. 29, 2021    (JP) .............................. JP2021-012555

(51) Int. Cl.
| | | |
|---|---|---|
| *F02D 41/14* | (2006.01) | |
| *F02D 41/00* | (2006.01) | |
| *G01M 15/11* | (2006.01) | |

(52) U.S. Cl.
CPC ..... *F02D 41/1498* (2013.01); *F02D 41/0087* (2013.01); *F02D 41/0097* (2013.01); *F02D 41/1401* (2013.01); *G01M 15/11* (2013.01); *F02D 2041/1432* (2013.01); *F02D 2041/1433* (2013.01); *F02D 2200/1012* (2013.01); *F02D 2200/1015* (2013.01)

(58) Field of Classification Search
CPC ............. F02D 41/1401; F02D 41/0097; F02D 41/0087; F02D 41/1498; F02D 2041/1432; F02D 2041/1433; F02D 2200/1012; F02D 2200/1015; G01M 15/11

USPC ... 123/435, 436, 481, 198 f, 406.14, 406.18, 123/406.58; 701/110, 111; 73/114.04, 73/114.02
See application file for complete search history.

(56) References Cited

U.S. PATENT DOCUMENTS

| 5,415,028 A | 5/1995 | Nishimura et al. |
| 2009/0308145 A1 | 12/2009 | Suzuki |

FOREIGN PATENT DOCUMENTS

| JP | 6-2609 A | | 1/1994 | |
| JP | 3958636 | * | 5/2007 | ............. F02D 41/22 |
| JP | 4023854 | * | 10/2007 | ............. G01M 15/11 |
| JP | 2008-057492 A | | 3/2008 | |
| JP | 2008-248877 A | | 10/2008 | |

* cited by examiner

*Primary Examiner* — Hai H Huynh
(74) *Attorney, Agent, or Firm* — Finnegan, Henderson, Farabow, Garrett & Dunner, LLP

(57) ABSTRACT

A CPU performs a regeneration process for a GPF by stopping combustion control of cylinder #1 and causing an air-fuel ratio of an air-fuel mixture in the other cylinders to be richer. The CPU calculates a rotational fluctuation amount which is used to detect random misfires in which a misfire rate in a predetermined period is equal to or greater than a predetermined proportion by calculating a difference in time et3txdh in which a crank shaft rotates by 30°CA. At the time of performing the regeneration process, the CPU calculates the rotational fluctuation amount based on a value obtained by removing an influence of torsion of a damper from the time et3txdh. When the influence of torsion is removed, 0.5th-order rotation and harmonics thereof are selectively used using a filter process.

5 Claims, 8 Drawing Sheets

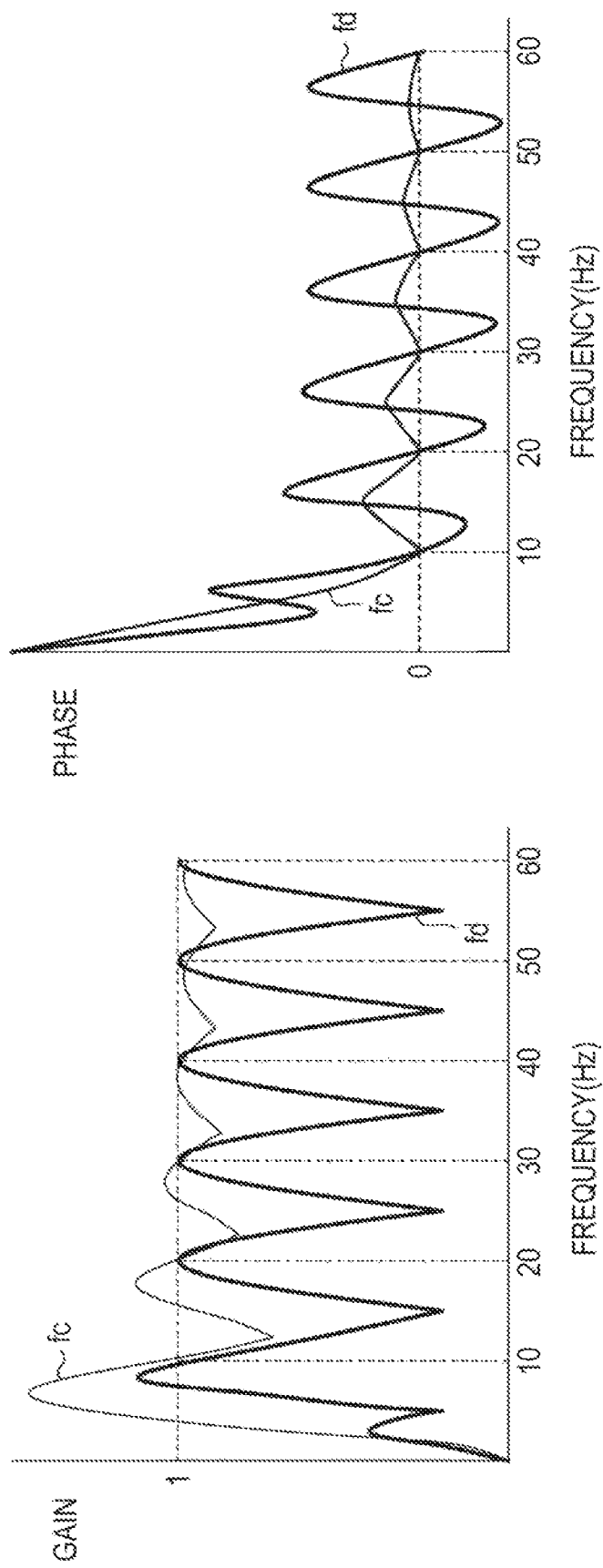

MISFIRE DETECTION DEVICE FOR INTERNAL COMBUSTION ENGINE

CROSS-REFERENCE TO RELATED APPLICATION

This application claims priority to Japanese Patent Application No. 2021-012555 filed on Jan. 29, 2021, incorporated herein by reference in its entirety.

BACKGROUND

1. Technical Field

The present disclosure relates to a misfire detection device for an internal combustion engine.

2. Description of Related Art

For example, a misfire detection device that is applied to an internal combustion engine in which a crank shaft is mechanically connected to a driving wheel side via a damper is described in Japanese Unexamined Patent Application Publication No. 2008-248877 (JP 2008-248877 A). This device calculates a torsion speed component due to resonance in a rotation speed of the crank shaft based on a physical model with a difference between the rotation speed of the crank shaft and a rear-side speed which is a rotation speed of the damper on the driving wheel side as an input. The device determines whether a misfire has occurred based on a value obtained by removing the torsion speed component from the rotation speed of the crank shaft. The device removes low-frequency components which are frequency components lower than a resonance frequency using a high-pass filter for a process of calculating the torsion speed component.

For example, a device that detects consecutive misfires and intermittent misfires in an internal combustion engine including a plurality of cylinders is described in Japanese Unexamined Patent Application Publication No. 6-2609 (JP 6-2609 A). Here, consecutive misfires are misfires in which a misfire rate of a specific cylinder is equal to or greater than a stipulated proportion because misfires have occurred consecutively in the specific cylinder, or the like. On the other hand, intermittent misfires are misfires in which a total misfire rate of a plurality of cylinders is equal to or greater than a predetermined proportion.

SUMMARY

The inventor investigated supplying unused fuel and oxygen to exhaust gas by stopping combustion control in only some cylinders and setting an air-fuel ratio of the other cylinders to be richer than a stoichiometric air-fuel ratio in order to perform a regeneration process of the exhaust gas in a post-processing device when an output torque of an internal combustion engine is not zero. However, in this case, there is concern that accuracy of determination of a misfire will be decreased by the regeneration process.

Operations and advantages of configurations of the present disclosure for solving the aforementioned problem will be described below.

(1) According to an aspect of the present disclosure, there is provided a misfire detection device for an internal combustion engine, the misfire detection device being applied to an internal combustion engine including a plurality of cylinders, a crank shaft of the internal combustion engine being connected to a torsional-rigidity member, the misfire detection device being configured to perform: a changing process of periodically changing an amount of combustion energy of the internal combustion engine in a period of 0.5th-order rotation of the crank shaft; a random misfire determining process of receiving a rotational fluctuation amount of the crank shaft as an input and determining that random misfires have occurred when a proportion at which misfires have occurred in a random misfire determination period is equal to or greater than a predetermined proportion; and a fluctuation amount calculating process of calculating the rotational fluctuation amount based on a crank signal, wherein the rotational fluctuation amount is a rate of change of an instantaneous speed variable, wherein the instantaneous speed variable is a variable indicating a speed when the crank shaft rotates, wherein the fluctuation amount calculating process includes a first process of calculating the rotational fluctuation amount selectively using at least one component of a frequency of 0.5th-order rotation of the crank shaft and a frequency of harmonics thereof by using a filter process and a second process of calculating the rotational fluctuation amount without using the filter process, and wherein the random misfire determining process includes a selection process of employing the rotational fluctuation amount calculated in the second process when the changing process is not being performed and employing the rotational fluctuation amount calculated in the first process when the changing process is being performed.

With the changing process, since a torque of the internal combustion engine changes periodically in a period of 0.5th-order rotation, torsion of the torsional-rigidity member may become severe when the frequency of 0.5th-order rotation or the frequency of harmonics thereof matches a resonance frequency. In this case, the torsion may greatly affect the value of the rotational fluctuation amount and accuracy of misfire determination based on the rotational fluctuation amount may decrease. Therefore, with the aforementioned configuration, it is possible to reduce an influence of torsion from the rotational fluctuation amount by calculating the rotational fluctuation amount selectively using at least one component of the 0.5th-order rotation and the harmonics thereof using the filter process.

When the filter process is used to selectively use at least one of the frequency component of the 0.5th-order rotation and the harmonic component thereof, there is concern that a gain at other frequencies will decrease excessively or a phase thereof will advance. On the other hand, when the changing process is not performed, the misfire rate in the random misfire determination period is equal to or greater than the predetermined proportion, and for example, the number of misfires occurring in each combustion cycle is less than one, torsion of the torsional-rigidity member immediately before a misfire has occurred can be ignored. In this situation, when the filter process is used, the rotational fluctuation amount used for misfire determination may increase or decrease excessively due to the filter process and accuracy of misfire determination may decrease. Therefore, with the aforementioned configuration, the rotational fluctuation amount is calculated without using the filter process when the changing process is not performed.

Accordingly, it is possible to accurately determine whether a misfire has occurred regardless of whether the changing process is to be performed.

(2) in the misfire detection device for an internal combustion engine, the first process may include: a crank-side acquisition process of acquiring a crank-side speed variable which is the instantaneous speed variable of the crank shaftand a rear-side acquisition process of acquiring a rear-side speed variable which is the instantaneous speed variable on a side of the torsional-rigidity member opposite to the crank shaft side, and the first process may be a process of receiving a difference between the crank-side speed variable and the rear-side speed variable as an input and calculating the rotational fluctuation amount based on a result obtained by removing a torsion speed component which is a component due to torsion of the torsional-rigidity member from the crank-side speed variable and may be a process of using the filter process to calculate the torsion speed component.

With this configuration, when the changing process is performed, the rotational fluctuation amount is calculated based on the instantaneous speed variable from which a torsion speed component has been removed. By selectively using at least one component of the 0.5th-order rotation and harmonics thereof using the filter process to calculate the torsion speed component, it is possible to accurately calculate the torsion speed component.

(3) The misfire detection device for an internal combustion engine may be configured to further perform a consecutive misfire determining process of receiving the rotational fluctuation amount as an input and determining that consecutive misfires have occurred in a specific cylinder out of the plurality of cylinders when a proportion at which misfires have occurred in the specific cylinder in a consecutive misfire determination period is equal to or greater than a stipulated proportion, and the consecutive misfire determining process may receive the rotational fluctuation amount calculated in the first process as an input.

When a misfire rate in a specific cylinder increases such as when a misfire occurs in a specific cylinder in each combustion cycle, the torque of the internal combustion engine changes periodically in a period of the 0.5th-order rotation. Accordingly, when the frequency of the 0.5th-order rotation or the frequency of harmonics thereof matches a resonance frequency, torsion of the torsional-rigidity member may become severe. In this case, the torsion may greatly affect the value of the rotational fluctuation amount and accuracy of determination of misfires based on the rotational fluctuation amount may decrease. Therefore, with the aforementioned configuration, the rotational fluctuation amount calculated using the filter process is used to determine whether the misfire rate in a specific cylinder is high. Accordingly, it is possible to accurately determine whether the misfire rate in a specific cylinder is high.

(4) In the misfire detection device for an internal combustion engine, the first process may include: a torsion component calculating process of receiving the difference between the crank-side speed variable and the rear-side speed variable as an input and calculating a torsion speed component which is a component due to torsion of the torsional-rigidity member in the crank-side speed variable based on a physical model; and a process of calculating the rotational fluctuation amount based on a determination speed variable which is the instantaneous speed variable of the crank shaft from which the torsion speed component has been removed, and the torsion component calculating process may be a process of performing the filter process on a variable which is handled by the physical model.

With this configuration, an influence of torsion can be removed from the rotational fluctuation amount by removing the torsion speed component from an instantaneous speed component based on the physical model. By performing the filter process to calculate the torsion speed component, it is possible to calculate the torsion speed component while selectively using a component of a frequency band of at least one of the 0.5th-order rotation and harmonics thereof.

(5) In the misfire detection device for an internal combustion engine, the filter process may include a process using a filter with the number of the input variables set to a multiple of the number of cylinders of the internal combustion engine.

With this configuration, a gain of a frequency component which is a multiple of 1/integer of an appearance frequency of a compression top dead center is set to "1," and it is possible to decrease a difference in phase characteristics and to accurately calculate the torsion speed component.

(6) In the misfire detection device for an internal combustion engine, the changing process may include a stopping process of stopping combustion control in some cylinders out of the plurality of cylinders.

With this configuration, since combustion energy which is generated in an expansion stroke of a certain cylinder is almost zero, it is possible to realize a changing process of periodically decreasing the amount of combustion energy in the vicinity of a compression top dead center of the certain cylinder.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 8 is a diagram illustrating gain characteristics and phase characteristics of a filter which is used in the embodiment.

DETAILED DESCRIPTION OF EMBODIMENTS

First Embodiment

Figure 1:
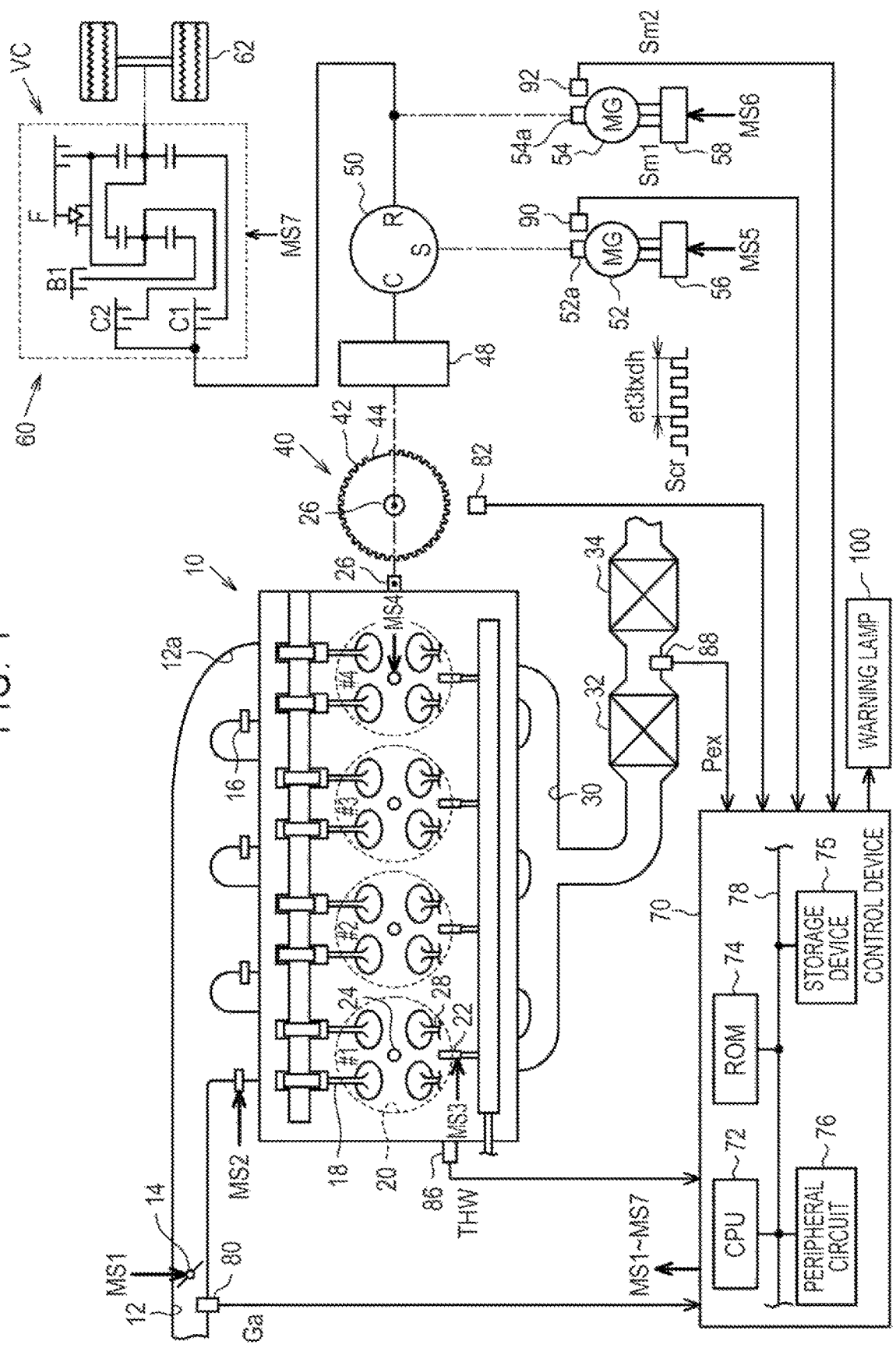
FIG. 1 is a diagram illustrating configurations of a drive system and a control device for a vehicle according to an embodiment.

As illustrated in FIG. 1, an internal combustion engine 10 that is mounted in a vehicle VC includes four cylinders #1 to #4. A throttle valve 14 is provided in an intake passage 12 of the internal combustion engine 10. A port injection valve 16 that injects fuel into an intake port 12a is provided in the intake port 12a which is located downstream in the intake passage 12. Air taken into the intake passage 12 and fuel injected from the port injection valve 16 flow into a combustion chamber 20 with opening of an intake valve 18. Fuel is injected into the combustion chamber 20 from a cylinder injection valve 22. An air-fuel mixture of air and fuel in the combustion chamber 20 is provided for combustion with spark discharge of an ignition plug 24. Combustion energy which is generated at that time is converted to rotational energy of a crank shaft 26. A compression top dead center appears in the order of cylinders #1, #3, #4, and #2 with rotation of the crank shaft 26.

The air-fuel mixture provided for combustion in the combustion chamber 20 is discharged as exhaust gas to an exhaust passage 30 with opening of an exhaust valve 28. A three-way catalyst 32 having an oxygen storage capacity and a gasoline particulate filter (GPF) 34 are provided in the exhaust passage 30. In this embodiment, it is assumed that the GPF 34 has a configuration in which a three-way catalyst is carried in a filter that collects particulate matter (PM).

A crank rotor 40 having toothed portions 42 provided therein is coupled to the crank shaft 26. The toothed portions 42 represent a plurality of rotation angles of the crank shaft 26. Basically, the toothed portions 42 are provided at intervals of 10°CA in the crank rotor 40, and one missing-tooth portion 44 which is a portion in which an interval between neighboring toothed portions 42 is 30°CA is provided. This is for representing a rotation angle serving as a reference of the crank shaft 26.

The crank shaft 26 is mechanically connected to a carrier C of a planetary gear mechanism 50 constituting a power split device via a damper 48. A rotation shat 52a of a first motor generator 52 is mechanically connected to a sun gear S of the planetary gear mechanism 50. A rotation shaft 54a of a second motor generator 54 and a gear shift mechanism 60 are mechanically connected to a ring gear R of the planetary gear mechanism 50. The gear shift mechanism 60 is mechanically connected to driving wheels 62. An AC voltage is applied to a terminal of the first motor generator 52 by an inverter 56. An AC voltage is applied to a terminal of the second motor generator 54 by an inverter 58.

A control device 70 controls the internal combustion engine 10 and operates operation units of the internal combustion engine 10 such as the throttle valve 14, the port injection valve 16, the cylinder injection valve 22, and the ignition plug 24 such that a torque, an exhaust gas component proportion, and the like which are control parameters of the internal combustion engine 10 are controlled. The control device 70 also controls the first motor generator 52 and operates the inverter 56 such that a rotation speed which is a control parameter of the first motor generator 52 is controlled. The control device 70 also controls the second motor generator 54 and operations the inverter 58 such that a torque which is a control parameter of the second motor generator 54 is controlled. The control device 70 operates the gear shift mechanism 60 such that a gear ratio which is a ratio of a rotation speed of the driving wheels 62 to a rotation speed of the crank shaft 26 is controlled. Operation signals MS1 to MS7 for the throttle valve 14, the port injection valve 16, the cylinder injection valve 22, the ignition plug 24, the inverters 56 and 58, and the gear shift mechanism 60 are illustrated in FIG. 1. The control device 70 controls the control parameters of the internal combustion engine 10 with reference to an amount of intake air Ga which is detected by an air flowmeter 80, an output signal Scr from a crank angle sensor 82, a coolant temperature THW which is detected by a coolant temperature sensor 86, and a pressure of exhaust gas Pex flowing into the GPF 34, which is detected by an exhaust gas pressure sensor 88. The control device 70 controls the control parameters of the first motor generator 52 with reference to an output signal Sm1 from a first rotation angle sensor 9) that detects a rotation angle of the first motor generator 52. The control device 70 controls the control parameters of the second motor generator 54 with reference to an output signal Sm2 from a second rotation angle sensor 92 that detects a rotation angle of the second motor generator 54.

The control device 70 includes a CPU 72, a ROM 74, a storage device 75, and a peripheral circuit 76, which are communicatively connected to each other via a communication line 78. Here, the peripheral circuit 76 includes a circuit that generates a clock signal for defining internal operations, a power supply circuit, and a reset circuit. The control device 70 controls the control parameters by causing the CPU 72 to execute a program stored in the ROM 74.

Particularly, the control device 70 performs a regeneration process of the GPF 34, a process of determining consecutive misfires which are abnormal misfires in which a misfire rate in a specific cylinder increases, and a process of determining random misfires in which a total misfire rate in cylinders #1 to #4 is equal to or greater than a predetermined proportion. Routines of these processes will be described below in detail in the order of "process associated with regeneration process," "process associated with determination of consecutive misfire," "process associated with determination of random misfire," and "process associated with calculation of rotational fluctuation amount for misfire determination."

"Process Associated with Regeneration Process"

Figure 2:
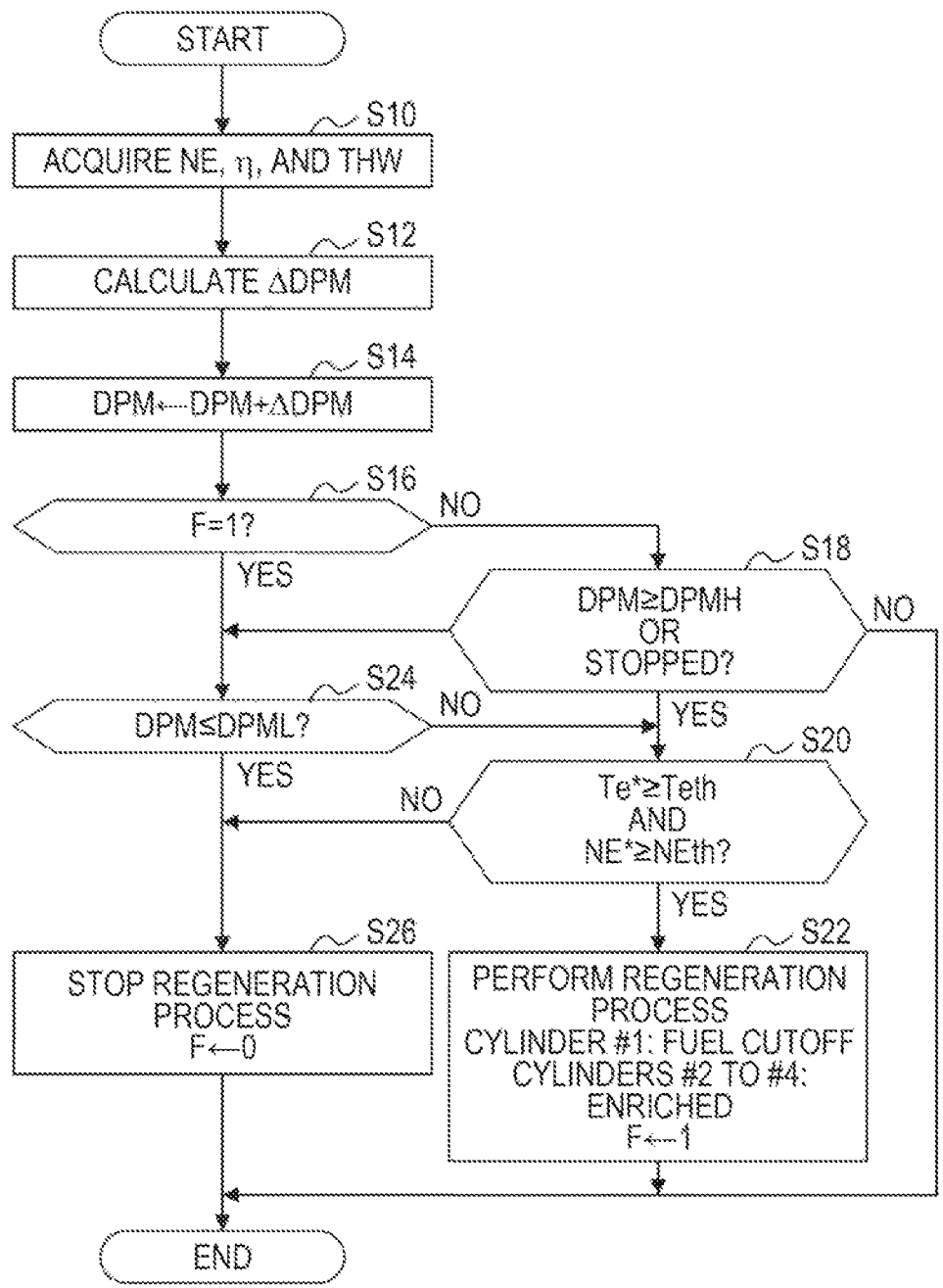
FIG. 2 is a flowchart illustrating a routine of a GPF regenerating process according to the embodiment.

A routine of a process associated with the regeneration process is illustrated in FIG. 2. The routine illustrated in FIG. 2 is realized by causing the CPU 72 to execute a program stored in the ROM 74, for example, repeatedly at predetermined intervals. Step numbers of the processes are expressed by numerals prefixed with "S" in the following description.

In a series of processes illustrated in FIG. 2, first, the CPU 72 acquires a rotation speed NE, a filling efficiency η, and a coolant temperature THW (S10). The rotation speed NE is calculated based on the output signal Scr by the CPU 72. The filling efficiency η is calculated based on the amount of intake air Ga and the rotation speed NE by the CPU 72. Then, the CPU 72 calculates an update amount ΔDPM of a deposition amount DPM based on the rotation speed NE, the filling efficiency η, and the coolant temperature THW (S12). Here, the deposition amount DPM is an amount of PM collected by the GPF 34. Specifically, the CPU 72 calculates an amount of PM in exhaust gas discharged to the exhaust passage 30 based on the rotation speed NE, the filling efficiency η, and the coolant temperature THW. The CPU 72 calculates the temperature of the GPF 34 based on the rotation speed NE and the filling efficiency η. Then, the CPU 72 calculates the update amount ΔDPM based on the amount of PM in exhaust gas and the temperature of the GPF 34. The CPU 72 can correct the update amount ΔDPM by decreasing it when the process of S22 which will be described later is performed.

Then, the CPU 72 updates the deposition amount DPM based on the update amount ΔDPM (S14). Then, the CPU 72 determines whether a flag F is "1" (S16). The flag F indicates that the regeneration process for combusting and removing PM of the GPF 34 is performed when it is "1," and indicates otherwise when it is "0." When it is determined that the flag F is "0" (S16: NO), the CPU 72 determines whether a logical sum of a condition indicating that the deposition amount DPM is equal to or greater than a regenerative value DPMH and a condition indicating that the process of S22 which will be described later is stopped is true (SIS). The regenerative value DPMH is set to a value at which the amount of PM collected by the GPF 34 is increased and the PM needs to be removed. When it is determined that the logical sum is true (S18: YES), the CPU 72 determines whether a logical product of condition (a) and condition (b) is true (S20). This process is a process of determining whether execution of the regeneration process is permitted.

Condition (a): A condition indicating that a required engine torque Te* which is a required torque for the internal combustion engine 10 is equal to or greater than a stipulated value Teth Condition (b): A condition indicating that a rotation speed command value NE* is equal to or greater than a stipulated speed NEth When it is determined that the logical product is true (S20: YES), the CPU 72 performs the regeneration process and substitutes "1" for the flag F (S22). That is, the CPU 72 stops injection of fuel from the port injection valve 16 and the cylinder injection valve 22 in cylinder #1. The CPU 72 operates the port injection valve 16 and the cylinder injection valve 22 such that an air-fuel ratio of an air-fuel mixture in the combustion chambers 20 of cylinders #2 to #4 is richer than a stoichiometric air-fuel ratio. This process is a process for discharging oxygen and unused fuel to the exhaust passage 30 and increasing the temperature of the GPF 34 to remove PM collected by the GPF 34. That is, the temperature of the exhaust gas can be increased and the temperature of the GPF 34 can also be increased by discharging oxygen and unused fuel to the exhaust passage 30 to combust unused fuel in the three-way catalyst 32 or the like. The PM collected by the GPF 34 can be combusted and removed by supplying oxygen to the GPF 34.

On the other hand, when it is determined that the flag F is "1" (S16: YES), the CPU 72 determines whether the deposition amount DPM is equal to or less than a stopping threshold value DPML (S24). The stopping threshold value DPML is set to a value at which the amount of PM collected by the GPF 34 is sufficiently small and the regeneration process can be stopped. When it is determined that the deposition amount DPM is equal to or greater than the stopping threshold value DPML (S24: NO), the CPU 72 causes the routine to proceed to S20. On the other hand, when it is determined that the deposition amount DPM is equal to or less than the stopping threshold value DPML (S24: YES) and when the determination result of S20 is negative, the CPU 72 stops the regeneration process and substitutes "0" for the flag F (S26).

When the processes of S22 and S26 are completed or when the determination result of S18 is negative, the CPU 72 temporarily ends the series of processes illustrated in FIG. 2.

"Process Associated with Determination of Consecutive Misfire"

Figure 3:
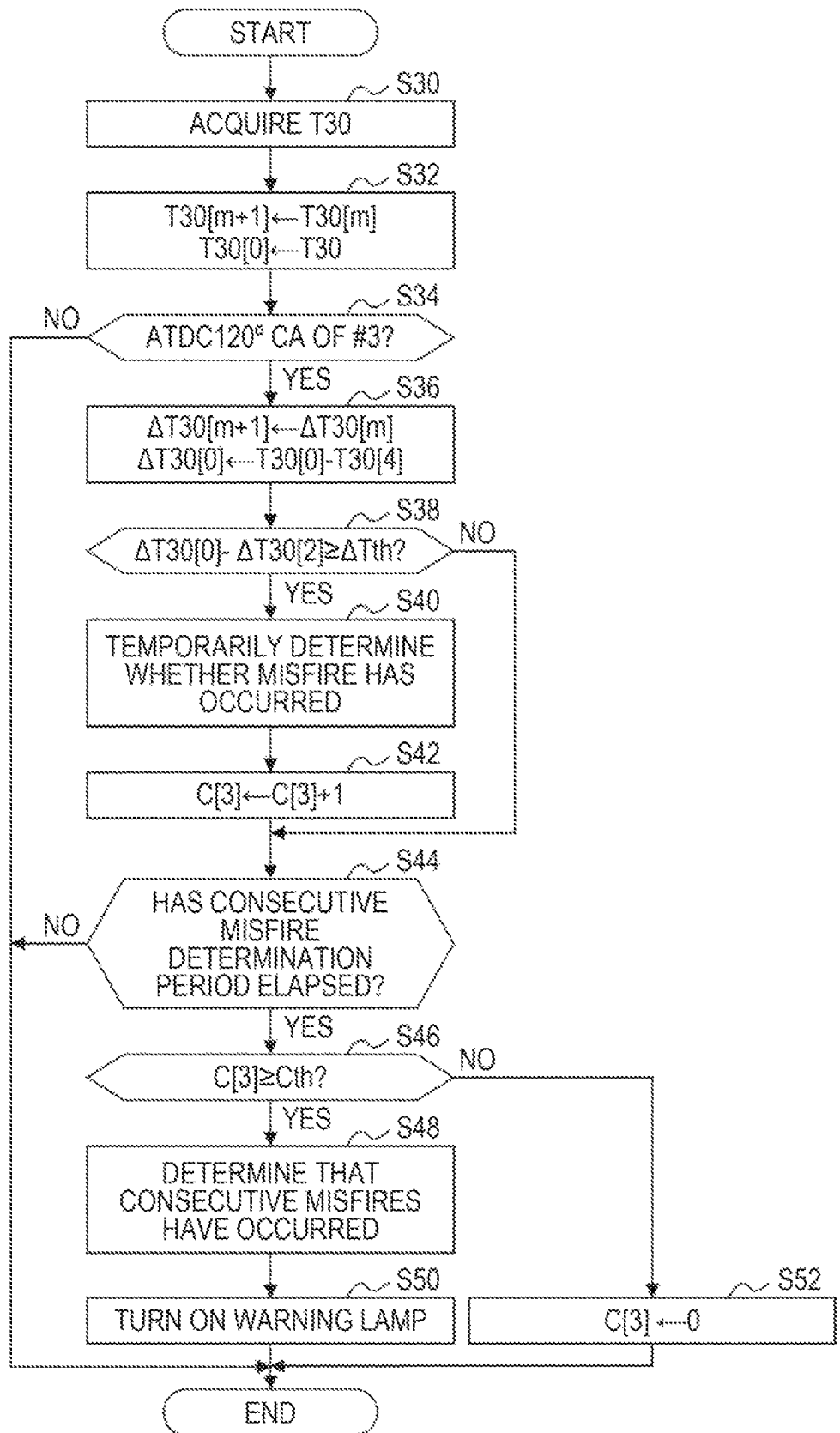
FIG. 3 is a flowchart illustrating a routine of a consecutive misfire determining process according to the embodiment.

A routine of the process associated with determination of consecutive misfires is illustrated in FIG. 3. For example, a process of determining whether an abnormality in which the misfire rate of cylinder #3 increases has occurred is illustrated in FIG. 3. The routine illustrated in FIG. 3 is realized by causing the CPU 72 to execute a program stored in the ROM 74, for example, repeatedly at intervals of a predetermined period.

In the series of processes illustrated in FIG. 3, first, the CPU 72 acquires a time T30 required for the crank shaft 26 to rotate by 30°CA (S30). Then, the CPU 72 substitutes the time T30[m] for the time T30[m+1], where "m=0, 1, 2, 3, . . . " is set, and substitutes the time T30 newly acquired in the process of S30 for the time T30101 (S32). This process is a process for increasing a numerical value of a variable in the parentheses after the time T30 as it progresses deeper into the past. Through this process, the time T30 moves back 30°CA when the value of the variable in the parentheses increments by 1.

Then, the CPU 72 determines whether the current rotation angle of the crank shaft 26 is ATDC 120°CA with respect to the compression top dead center of cylinder #3 (S34). When it is determined that the rotation angle is ATDC 120°CA (S34: YES), the CPU 72 substitutes a rotational fluctuation amount $\Delta T30[m]$ for a rotational fluctuation amount $\Delta T30[m+1]$ and substitutes a value obtained by subtracting the time T30[4] from the time T30[0] for the rotational fluctuation amount $\Delta T30[0]$ (S36). The rotational fluctuation amount $\Delta T30$ is a variable which is a negative value when a misfire has not occurred in a cylinder in which it is determined whether a misfire has occurred and which is a positive value when a misfire has occurred. Here, the cylinder in which it is determined whether a misfire has occurred is a cylinder in which it has been determined that the compression top dead center has been passed by 120° through the process of S34, that is, cylinder #3.

Then, the CPU 72 determines whether a value obtained by subtracting the rotational fluctuation amount $\Delta T30[2]$ from the rotational fluctuation amount $\Delta T30[0]$ is equal to or less than a threshold value $\Delta Tth$ (S38). This process is a process of determining whether a misfire has occurred in a determination target cylinder. That is, when a misfire has not occurred, the rotational fluctuation amount $\Delta T30[0]$ and the rotational fluctuation amount $\Delta T30[2]$ have about the same value and thus a difference therebetween has a small absolute value. On the other hand, when a misfire has occurred in the determination target cylinder, the rotational fluctuation amount $\Delta T30[0]$ has a positive value. On the other hand, when a misfire has not occurred in a cylinder in which the compression top dead center appears 360°CA before the determination target cylinder, the rotational fluctuation amount $\Delta T30[2]$ is a negative value. Accordingly, when a misfire has occurred in a determination target cylinder, a value obtained by subtracting the rotational fluctuation amount $\Delta T30[2]$ from the rotational fluctuation amount $\Delta T30[0]$ is a positive value with a large absolute value.

When it is determined that the value is equal to or greater than the threshold value $\Delta Tth$ (S38: YES), the CPU 72 temporarily determines that a misfire has occurred in the cylinder #3 (S40). Then, the CPU 72 increments a counter C[3] that counts the number of temporary determinations in cylinder 43 (S42).

When the process of S42 has been completed or when the determination result of S38 is negative, the CPU 72 determines whether a consecutive misfire determination period has elapsed (S44). Here, a start point of the consecutive misfire determination period is the later timing of a timing at which the process of S38 was first performed and a timing at which the process of S52 which will be described later was last performed. When it is determined that the consecutive misfire determination period has elapsed (S44: YES), the CPU 72 determines whether the counter C[3] is equal to or greater than a threshold value Cth (S46). The threshold value Cth is set based on a lower limit value of a misfire rate when a misfire has occurred at a non-ignorable misfire rate in the consecutive misfire determination period. That is, the length of the consecutive misfire determination period and the threshold value Cth are determined based on the lower limit value in advance.

When it is determined that the value of the counter C[3] is equal to or greater than the threshold value Cth (S46: YES), the CPU 72 regularly determines that consecutive misfires have occurred (S48) and performs a notification process of notifying a user that a misfire has occurred at a non-ignorable misfire rate in cylinder #3 by operating a warning lamp 100 illustrated in FIG. 1 (S50). On the other hand, when it is determined that the value of the counter C[3] is less than the threshold value Cth (S46: NO), the CPU 72 initializes the counter C[3] (S52).

When the processes of S50 and S52 have been completed and when the determination results of S34 and S44 are negative, the CPU 72 temporarily ends the series of processes illustrated in FIG. 3.

"Process Associated with Determination of Random Misfire"

Figure 4:
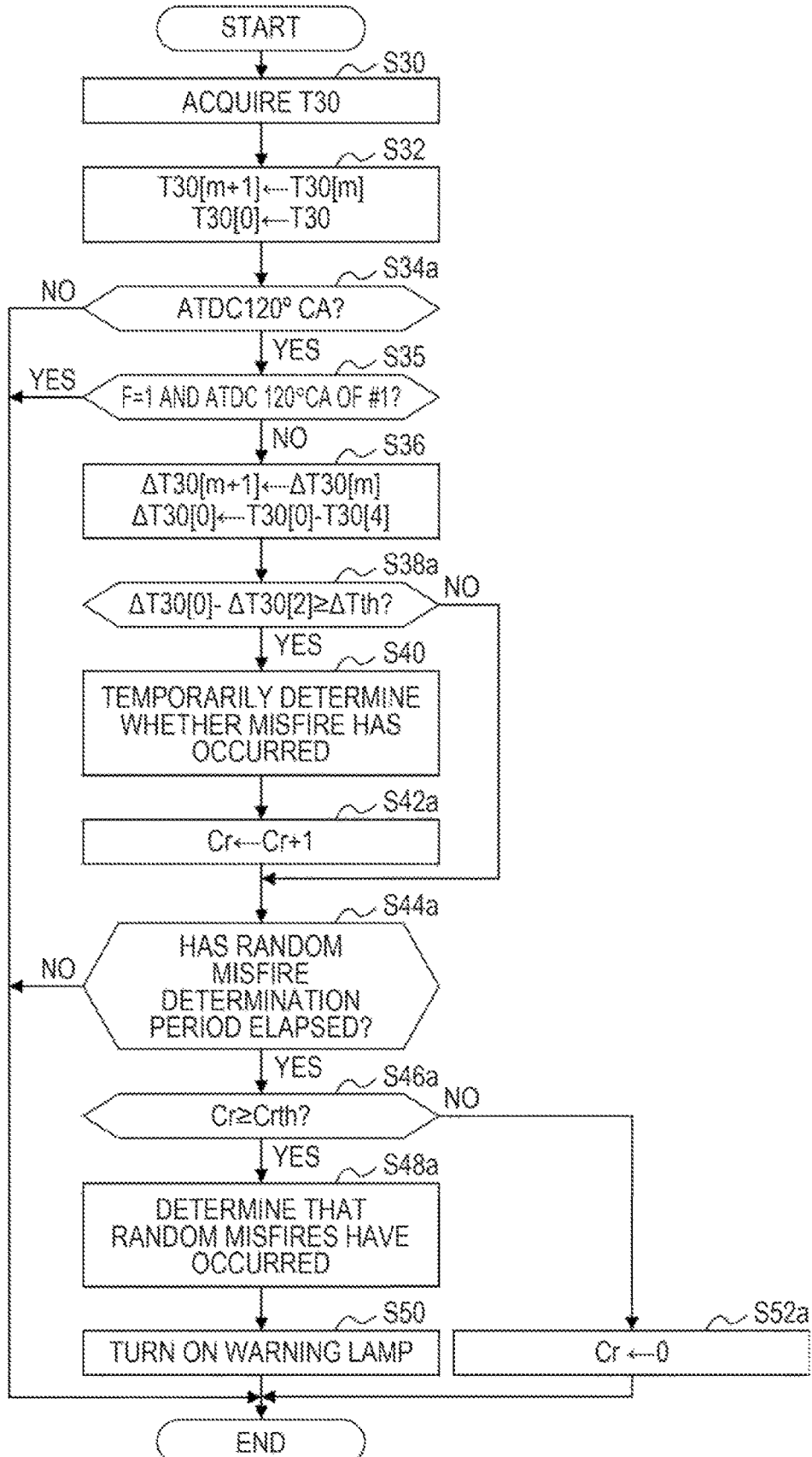
FIG. 4 is a flowchart illustrating a routine of a random misfire determining process according to the embodiment.

A routine of the process associated with determination of random misfires is illustrated in FIG. 4. The routine illustrated in FIG. 4 is realized by causing the CPU 72 to execute a program stored in the ROM 74, for example, repeatedly at intervals of a predetermined period. In FIG. 4, processes corresponding to the processes illustrated in FIG. 3 will be referred to by the same step numbers for the purpose of convenience and description thereof will be omitted.

In the series of processes illustrated in FIG. 4, when the processes of S30 and S32 have been completed, the CPU 72 determines whether the rotation angle is ATDC 120°CA with respect to the compression top dead center of one of cylinders #1, #2, #3, and #4 (S34a). When it is determined that the rotation angle is ATDC 120°CA (S34a: YES), the CPU 72 determines whether the flag F is "1" and the rotation angle in cylinder #1 is ATDC 120°CA (S35). When the flag F is "0" or when the flag F is "1" and the rotation angle is ATDC 120°CA in one of cylinders #2, #3, and #4 (S35: NO), the CPU 72 performs the process of S36.

Then, the CPU 72 determines whether a value obtained by subtracting the rotational fluctuation amount ΔT30[2] from the rotational fluctuation amount ΔT30[0] is equal to or greater than a threshold value ΔTth (S38a). When it is determined that the value is equal to or greater than the threshold value ΔTth (S38a: YES), the CPU 72 temporarily determines that a misfire has occurred in a cylinder in which it is determined whether a misfire has occurred (S40). The determination target cylinder is a cylinder of which the compression top dead center appears on a 120° advance side from a time point at which the determination result of S34a is determined to be positive. When the process of S4t) has been completed, the CPU 72 increments a counter Cr that counts the number of times the process of S40 is performed (S42a).

When the process of S42a has been completed or when the determination result of S38a is negative, the CPU 72 determines whether a random misfire determination period has elapsed (S44a). Here, a start point of the random misfire determination period is the later timing of a timing at which the process of S38a was first performed and a timing at which the process of S52a which will be described later was last performed. When it is determined that the random misfire determination period has elapsed (S44a: YES), the CPU 72 determines whether the counter Cr is equal to or greater than a threshold value Crth (S46a). The threshold value Crth and the random misfire determination period are set based on a lower limit value at which a misfire rate in the random misfire determination period exceeds an allowable range. At least one of the length of the random misfire determination period and the threshold value Crth is preferably set to vary based on the number of times the determination result of S35 is determined to be positive in the random misfire determination period. Specifically, for example, when the number of times the determination result of S35 is determined to be positive in the random misfire determination period is large, the threshold value Crth can be set to be less than when the number of times is small. For example, when the number of times the determination result of S35 is determined to be positive in the random misfire determination period is large, the length of the random misfire determination period may be set to be longer than when the number of times is small. With this setting, it is possible to curb fluctuation of a misfire rate when the determination result of S46a is positive.

When it is determined that the counter Cr is equal to or greater than the threshold value Crth (S46a: YES), the CPU 72 determines that random misfires have occurred (S48a) and performs the process S50. On the other hand, when the counter Cr is less than the threshold value Crth (S46a: NO), the CPU 72 initializes the counter Cr (S52a).

When the processes of S50 and S52a have been completed, when the determination results of S34a and S44a are negative, and when the determination result of S35 is positive, the CPU 72 temporarily ends the series of processes illustrated in FIG. 4.

"Process Associated with Calculation of Rotational Fluctuation Amount for Determination of Misfire"

Figure 5:
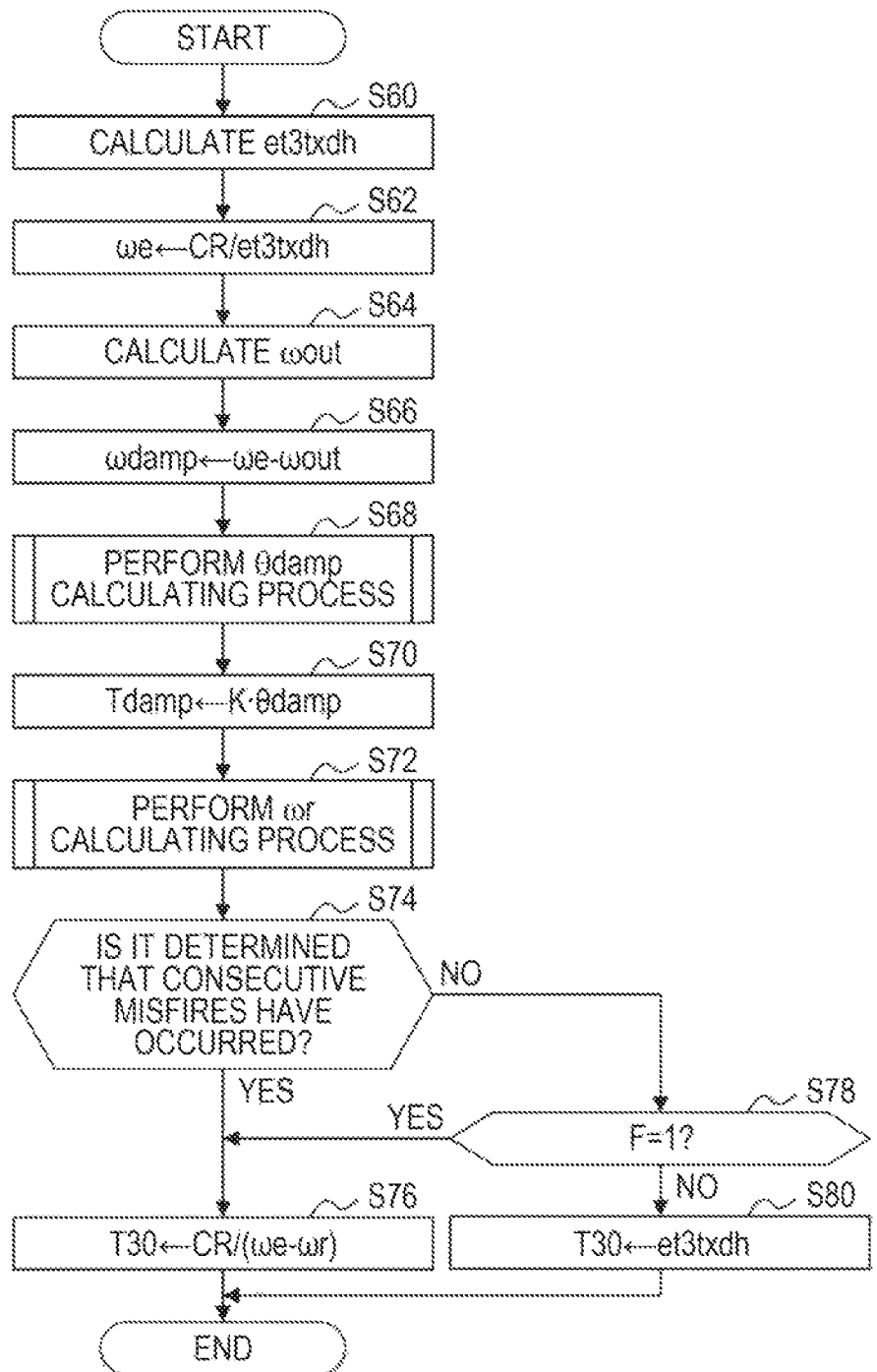
FIG. 5 is a flowchart illustrating a routine of an instantaneous speed variable calculating process according to the embodiment.

A routine of the process of calculating a time T30 required for the damper 48 to rotate by 30°CA is illustrated in FIG. 5. The routine illustrated in FIG. 5 is realized by causing the CPU 72 to execute a program stored in the ROM 74, for example, repeatedly at intervals of a period in which the crank shaft 26 rotates by 30°CA. Specifically, for example, the routine is repeatedly performed with detection of a predetermined toothed portion 42 by the crank angle sensor 82 as a trigger. It is assumed that the predetermined toothed portion 42 is defined every 30°CA.

In the series of processes illustrated in FIG. 5, first, the CPU 72 calculates a time et3txdh required for the crank shaft 26 to rotate in a nearby rotation angle area of 30°CA (S60). As illustrated in FIG. 1, this process is a process of counting a time required until the crank angle sensor 82 detects one of two toothed portions 42 separated by 30°CA after detecting the other. Then, the CPU 72 calculates a crank-side speed we which is the rotation angle of the crank shaft 26 in the nearby rotation angle area of 30°CA by dividing an angle constant CR corresponding to 30°CA by the time et3txdh (S62).

Then, the CPU 72 calculates a rear-side speed ωout which is the rotation speed of the damper 48 on the carrier C side (S64). The CPU 72 calculates the rear-side speed ωout based on a rotation speed ωm in a minute rotation angle area of the rotation shaft 52a of the first motor generator 52, a rotation speed ωm2 in a minute rotation angle area of the rotation shaft 54a of the second motor generator 54, and a gear ratio of the planetary gear mechanism 50. Here, the minute rotation angle area is defined as a rotation angle area less than one whole rotation. The rotation speed mml is calculated based on the output signal Sm1 of the first rotation angle sensor 90 by the CPU 72. The rotation speed ωm2 is calculated based on the output signal Sm2 of the second rotation angle sensor 92 by the CPU 72.

Then, the CPU 72 substitutes a value obtained by subtracting the rear-side speed ωout from the crank-side speed we for a difference speed ωdamp (S66). Then, the CPU 72 calculates a torsion angle θdamp of the damper 48 on the crank shaft 26 side and the carrier C side based on a process of integrating the difference speed ωdamp (S68). The CPU 72 substitutes a value obtained by multiplying the torsion angle θdamp by an elasticity coefficient K for a torsion torque Tdamp (S70). The torsion torque Tdamp is a torque which is generated because the absolute value of the torsion angle θdamp becomes greater than zero.

Then, the CPU 72 calculates a torsion speed component ωr which is a speed component obtained by quantifying an influence of the torque generated due to torsion of the damper 48 on the rotation speed of the crank shaft 26 based on the process of integrating the torsion torque Tdamp (S72). Here, a physical model that calculates the torsion speed component ωr through a process of integrating an angular acceleration component of the crank shaft 26 which is proportional to the torsion torque Tdamp is used.

Then, the CPU 72 determines whether a time T30 for determination of consecutive misfires is required (S74). When it is determined that the time T30 for determination of consecutive misfires is required (S74: YES), the CPU 72 substitutes a value obtained by dividing the angle constant CR by a value obtained by subtracting the torsion speed component ωr from the crank-side speed we for the time T30 for the process of S30 in FIG. 3 (S76). On the other hand, when it is determined that the time T30 for determination of consecutive misfires is not required (S74: NO), the CPU 72 determines whether the flag F is "1" (S78). When it is determined that the flag F is "0" (S78: NO), the CPU 72 substitutes the time et3txdh calculated in the process of S60 for the time T30 for the process of S30 in FIG. 4 (S80).

On the other hand, when it is determined that the flag F is "1" (S78: YES), the CPU 72 substitutes a value obtained by dividing the angle constant CR by a value obtained by subtracting the torsion speed component ωr from the crank-side speed we for the time T30 for the process of S30 in FIG. 4 (S76).

When the processes of S76 and S80 have been completed, the CPU 72 temporarily ends the series of processes illustrated in FIG. 5.

Figure 6:
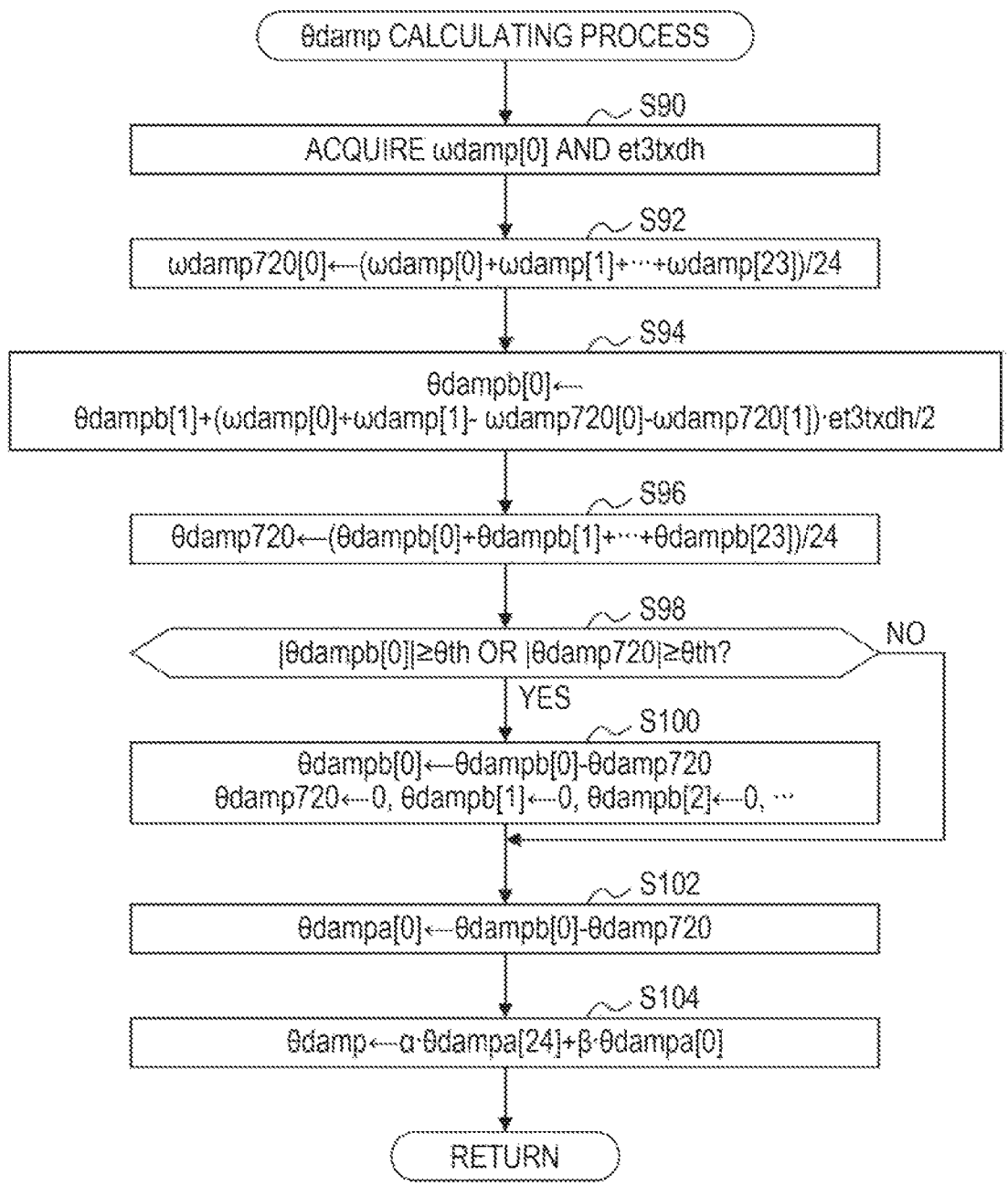
FIG. 6 is a flowchart illustrating a detailed routine of a part of the instantaneous speed variable calculating process according to the embodiment.

A detailed routine of the process of S68 is illustrated in FIG. 6.

In the series of processes illustrated in FIG. 6, first, the CPU 72 acquires the immediately calculated difference speed ωdamp and the time et3txdh (S90). Then, the CPU 72 substitutes a simple moving average value of 24 difference speeds ωdamp[0] to ωdamp[23] which have been immediately calculated for an average difference speed ωdamp720[0] (S92). The average difference speed ωdamp720 is a variable from which a high-frequency component of the difference speed ωdamp has been removed. In other words, the average difference speed ωdamp720 is a variable obtained by performing a low-pass filter process on the difference speed ωdamp. A larger value of the variable i in the difference speed ωdamp[i] indicates a value which is deeper into the past.

Then, the CPU 72 calculates a torsion angle θdampb serving as a base of the torsion angle θdamp through the process of integrating the difference speed ωdamp (S94). In this embodiment, trapezoidal approximation is exemplified as the integration process. That is, an integral element in this embodiment sets a variable which is added to a previous torsion angle θdampb[1] to calculate a current torsion angle θdampb[0] as a value corresponding to "½" of a product of a sum of difference speeds ωdamp[0] and ωdamp[1] and the time et3txdh, instead of a value obtained by multiplying the current difference speed ωdamp[0] by the time et3txdh. Specifically, the variable is set to "½" of a product of a sum of values obtained by removing a low-frequency component from the difference speeds ωdamp[0] and ωdamp[1] and the time et3txdh. Here, the value obtained by removing a low-frequency component from the difference speed ωdamp[0] is "ωdamp[0]-ωdamp720[0]" and the value obtained by removing a low-frequency component from the difference speed ωdamp[1] is "ωdamp[1]-ωdamp720[1]." Here, the low-frequency component is a component with a period longer than one combustion cycle.

Then, the CPU 72 substitutes a simple moving average value of 24 torsion angles θdampb[0] to θdampb[23] which have been immediately calculated for an average torsion angle θdamp720 (S96). The average torsion angle θdamp720 is a variable from which a high-frequency component of the torsion angle θdampb has been removed. In other words, the average torsion angle θdamp720 is a variable obtained by performing a low-pass filter process on the torsion angle θdampb. A larger value of the variable i in the torsion angle θdampb[i] indicates a value which is deeper into the past.

Then, the CPU 72 determines whether a logical sum of a condition indicating that the absolute value of the torsion angle θdampb[0] is equal to or greater than a threshold value θth and a condition indicating that the absolute value of the average torsion angle θdamp720 is equal to or greater than the threshold value θth is true (S98). This process is a process of determining whether a low-frequency component which could not be removed using even the average difference speed ωdamp720 is accumulated in the torsion angle θdampb and whether a low-frequency component is accumulated in the average difference speed ωdamp720. When it is determined that the logical sum is true (S98: YES), the CPU 72 substitutes a value obtained by subtracting the average torsion angle θdamp720 from the torsion angle θdampb[0] for the torsion angle θdampb[0] and initializes the average torsion angle θdamp720 and the torsion angles θdampb[1], θdampb[2], . . . (S100).

When the process of S100 has been completed and when the determination result of the process of S98 is negative, the CPU 72 substitutes a value obtained by subtracting the average torsion angle θdamp720 from the torsion angle θdampb[0] for a torsion angle θdampa[0] (S102). This process is a process of removing a low-frequency component from the torsion angle θdampb[0]. Here, the low-frequency component is a component with a period longer than one combustion cycle.

Then, the CPU 72 calculates a torsion angle θdamp by performing a comb filter process on the torsion angle θdampa (S104). In this embodiment, a feed-forward type filter is employed as the comb filter. Specifically, a filter for calculating a weighted moving average value of the current torsion angle θdampa[0] and the torsion angle θdampa[24] one combustion cycle ago is employed. That is, the CPU 72 calculates a sum of a value obtained by multiplying the current torsion angle θdampa[0] by a coefficient pi and a value obtained by multiplying the torsion angle θdampa[24] one combustion cycle ago by a coefficient α as the torsion angle θdamp. Here, "α+β=1" is satisfied.

When the process of S104 has been completed, the CPU 72 ends the routine of the process of S68 illustrated in FIG. 5.

Figure 7:
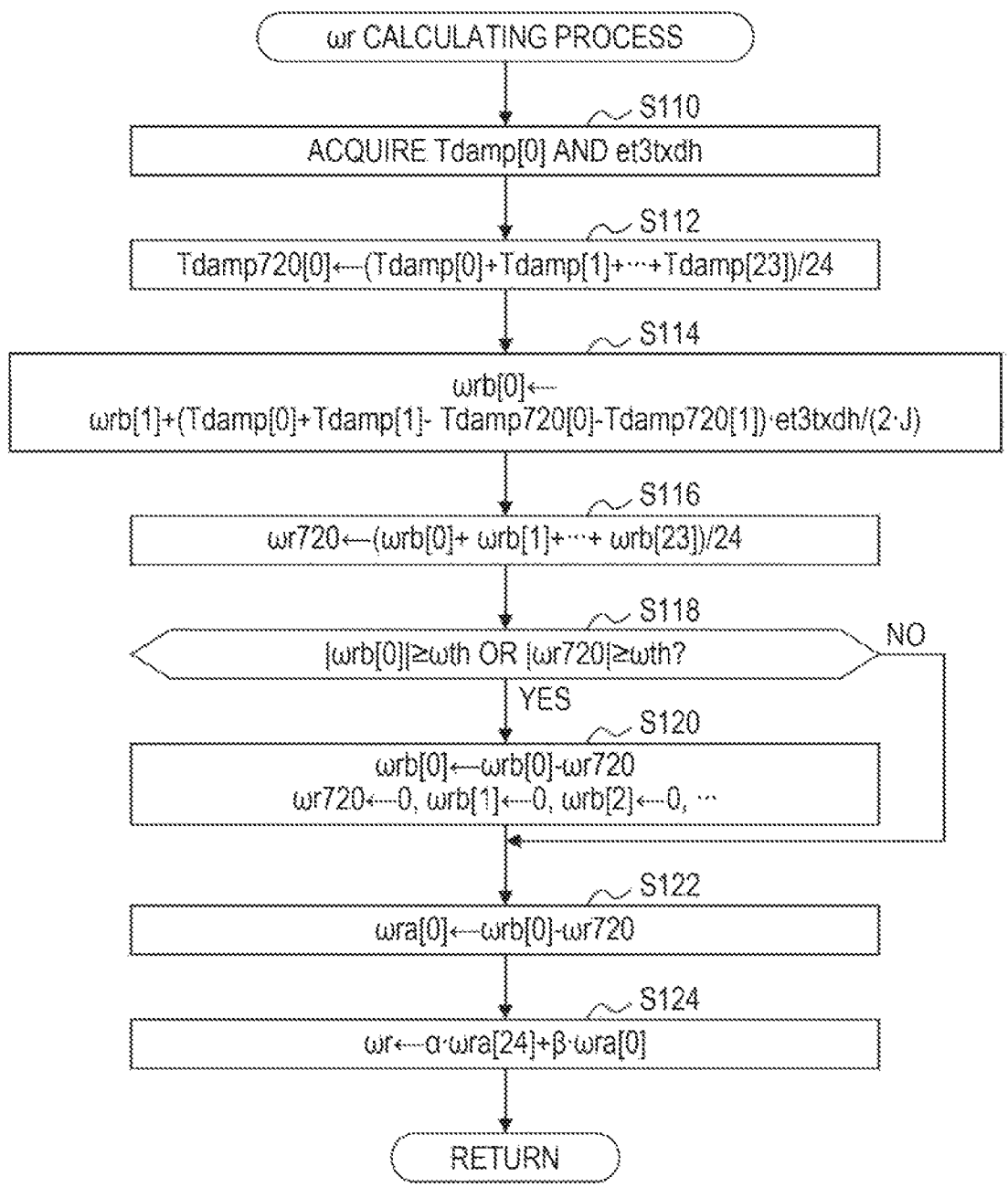
FIG. 7 is a flowchart illustrating a detailed routine of a part of the instantaneous speed variable calculating process according to the embodiment.

A detailed routine of the process of S72 illustrated in FIG. 5 is illustrated in FIG. 7.

As illustrated in FIG. 7, first, the CPU 72 acquires the newest torsion torque Tdamp[0] calculated in the process of S70 and the time et3txdh (S110). Then, the CPU 72 substitutes a simple moving average value of 24 torsion torques Tdamp[0] to Tdamp[23] which have been immediately calculated for an average torsion torque Tdamp720[0] (S112). The average torsion torque Tdamp720 is a variable from which a high-frequency component of the torsion torque Tdamp has been removed. In other words, the average torsion torque Tdamp720 is a variable obtained by performing a low-pass filter process on the torsion torque Tdamp. A larger value of the variable i in the torsion torque Tdamp[i] indicates a value which is deeper into the past.

Then, the CPU 72 calculates a torsion speed component arb serving as a base of the torsion speed component ωr through the process of integrating a value obtained by dividing the torsion torque Tdamp by an inertia coefficient J (S114). In this embodiment, trapezoidal approximation is exemplified as the integration process. That is, an integral element in this embodiment sets a variable which is added to a previous torsion speed component ωr[1] to calculate a current torsion speed component ωrb[0] as a value corresponding to "½" of a product of a sum of values obtained by dividing the torsion torques Tdamp[0] and Tdamp[1] by the inertia coefficient J and the time et3txdh. Specifically, the variable is set to "½" of a product of a sum of values obtained by removing a low-frequency component from the torsion torques Tdamp[0] and Tdamp[1] and the time et3txdh. Here, the value obtained by removing a low-frequency component from the torsion torque Tdamp[0] is "Tdamp[0]-Tdamp720[0]" and the value obtained by removing a low-frequency component from the torsion torque Tdamp[1] is "Tdamp[1]-Tdamp720[1]." Here, the low-frequency component is a component with a period longer than one combustion cycle.

Then, the CPU 72 substitutes a simple moving average value of 24 torsion speed components ωrb[0] to ωrb[23] which have been immediately calculated for an average torsion speed component ωr720 (S116). The average torsion speed component ωr720 is a variable from which a high-frequency component of the torsion speed component ωrb has been removed. In other words, the average torsion speed component ωr720 is a variable obtained by performing a low-pass filter process on the torsion speed component ωrb. A larger value of the variable i in the torsion speed component ωrb[1] indicates a value which is deeper into the past.

Then, the CPU 72 determines whether a logical sum of a condition indicating that the absolute value of the torsion speed component ωrb[0] is equal to or greater than a threshold value ωth and a condition indicating that the absolute value of the average torsion speed component ωr720 is equal to or greater than the threshold value ωth is true (S118). This process is a process of determining whether a low-frequency component which could not be removed using even the average torsion speed component ωr720 is accumulated in the torsion speed component arb and whether a low-frequency component is accumulated in the average speed component ωr720. When it is determined that the logical sum is true (S118: YES), the CPU 72 substitutes a value obtained by subtracting the average torsion speed component ωr720 from the torsion speed component ωrb[0] for the torsion speed component ωrb[0] and initializes the average torsion speed component ωr720 and the torsion speed components ωrb[1], ωrb[2], . . . (S120).

When the process of S120 has been completed or when the determination result of the process of S118 is negative, the CPU 72 substitutes a value obtained by subtracting the average torsion speed component ωr720 from the torsion speed component ωrb[0] for the torsion speed component ωra[0] (S122). This process is a process of removing a low-frequency component from the torsion speed component ωrb[0]. Here, the low-frequency component is a component with a period longer than one combustion cycle.

Then, the CPU 72 calculates a torsion speed component ωr by performing a comb filter process on the torsion speed component ωra (S124). In this embodiment, a feed-forward type filter is employed as the comb filter. Specifically, a filter for calculating a weighted moving average value of the current torsion speed component ωra[0] and the speed component ωra[24] one combustion cycle ago is employed. That is, the CPU 72 calculates a sum of a value obtained by multiplying the current torsion speed component ωra[0] by a coefficient β and a value obtained by multiplying the torsion speed component ωra[24] one combustion cycle ago by a coefficient α as the torsion speed component ωr. Here, "α+β=1" is satisfied.

When the process of S124 has been completed, the CPU 72 ends the routine of the process of S72 illustrated in FIG. 5.

Gain characteristics and phase characteristics of the filter in this embodiment are illustrated in FIG. 8. In FIG. 8, for the purpose of convenience of explanation, it is schematically assumed that a resonance frequency is matched when 0.5th-order rotation is 10 Hz and first-order rotation is 20 Hz.

A curve fc illustrated in FIG. 8 represents characteristics in which the low-pass filters used in the processes of S92, S96, S112, and S116 and the integral elements are combined. As illustrated in FIG. 8, a gain at a frequency which is a multiple of the frequency of the 0.5th-order rotation is set up to "1" and a phase thereof is set up to "0" by combining the integral elements and the low-pass filters. A curve fd illustrated in FIG. 8 represents characteristics to which the comb filters used in the processes of S104 and S124 are added. As illustrated in FIG. 8, a gain at a frequency lower than the 0.5th-order rotation can be decreased using the comb filter. This is because a filter for extracting a component which is a multiple of the frequency of the 0.5th-order rotation is used as the comb filter.

Operations and advantages in this embodiment will be described below.

When an amount of PM collected by the GPF 34 increases, the CPU 72 performs the regeneration process. That is, the CPU 72 performs a stopping process of stopping combustion control of cylinder #1 and a rich combustion process of setting an air-fuel ratio of an air-fuel mixture of cylinders #2 to #4 to be richer. Accordingly, when the regeneration process is performed, combustion energy is generated in a period of 180°CA and combustion energy is zero once every 720°CA. That is, a torque miss occurs once every 720°CA. Accordingly, intensities of frequency components of the 0.5th-order rotation and harmonics thereof increase with rotation of the crank shaft 26. Accordingly, when the frequency of the 0.5th-order rotation or harmonics thereof matches a resonance frequency of a drive system, the damper 48 is greatly twisted and a rotational behavior of the crank shaft 26 is markedly different from that when resonance does not occur. In this case, it may be difficult to identify a cylinder in which a misfire has occurred depending on the rotational fluctuation amount ΔT30 which is calculated directly using the time et3txdh which is a difference between the detection timings of the toothed portions 42 separated by 30°CA.

Therefore, in this embodiment, when the regeneration process is performed, the time T30 which is a value obtained by dividing the angle constant CR by a value obtained by subtracting the torsion speed component ωr from the crank-side speed we is used for the process of determining random misfires. Here, the CPU 72 removes a low-frequency component in calculating the torsion speed component ωr using a filter in which the gain when the rotation frequency of the crank shaft 26 of the internal combustion engine 10 is a multiple of the frequency of the 0.5th-order rotation is "1" and the phase thereof is arranged. Accordingly, when a frequency which is a multiple of the frequency of the 0.5th-order rotation matches the resonance frequency, it is possible to calculate the torsion speed component ωr selectively using the resonance frequency component. By removing the torsion speed component, the rotational fluctuation amount ΔT30 can be set to the same amount as when torsion does not occur in the damper 48. Accordingly, it is possible to accurately determine whether random misfires have occurred.

In the filter, the gain at the frequency which is a multiple of the frequency of the 0.5th-order rotation is "1" and the phase thereof is arranged. However, in the other frequency band, the gain departs from "1" and the phase advances or lags. When the number of times a misfire has occurred in one combustion cycle is less than 1 and the regeneration process is not performed, the amount of torsion of the damper 48 is ignorable. Accordingly, before a misfire has occurred, the difference speed ωdamp calculated in the process of S66 is zero. When a misfire occurs in this situation, the damper 48 is twisted due to the misfire and the magnitude of the difference speed ωdamp increases. In this case, based on the characteristics of the filter used to calculate the torsion speed component ωr, the torsion speed component ωr used to calculate the rotational fluctuation amount ΔT30 when a misfire has occurred becomes greater than zero due to advance in phase of the frequency component other than the 0.5th-order rotation and harmonics thereof, or the like. Accordingly, noise due to the characteristics of the filter overlaps the rotational fluctuation amount ΔT30 and thus accuracy of determination of random misfires is decreased.

Therefore, in this embodiment, when the regeneration process is not performed, whether random misfires have occurred is determined based on the rotational fluctuation amount ΔT30 calculated directly using the time et3txdh which is a difference between the detection timings of the toothed portions 42 separated by 30°CA.

Accordingly, it is possible to enhance accuracy of temporary determination of random misfires regardless of whether the regeneration process is performed.

According to the aforementioned embodiment, the following operations and advantages can be additionally achieved.

(1) The CPU 72 performs the process of determining whether consecutive misfires have occurred using the time T30 which is value obtained by dividing the angle constant CR by a value obtained by subtracting the torsion speed component ωr from the crank-side speed ωe. Accordingly, in comparison with a case in which the time et3txdh is used, it is possible to enhance accuracy of temporary determination of consecutive misfires.

(2) The filter in which the gain at the frequency which is a multiple of the frequency of the 0.5th-order rotation is "1" and the phase thereof is arranged is used to remove a low-frequency component in calculating the torsion speed component ωr. Accordingly, even when a plurality of different frequencies matches the resonance frequency of the drive system, it is possible to cope with such a situation using a common filter for calculating the torsion speed component ωr. This is particularly effective when the gear shift mechanism 60 is provided. That is, in this case, for example, a phenomenon may occur in which the frequency of the 0.5th-order rotation matches the resonance frequency of the drive system when the gear ratio of the gear shift mechanism 60 is a fourth stage and the frequency of the first-order rotation matches the resonance frequency when the gear ratio is a first stage. In this case, the gains for the 0.5th-order rotation and the first-order rotation in the filter used to calculate the torsion speed component tor need to be set to be as a large constant value as possible and the phase characteristics thereof need to be arranged. This is because a logic used to calculate the torsion speed component ωr needs to be changed depending on whether the gear ratio is the fourth stage or the first stage when the gain characteristics are the same but the phase characteristics are not arranged.

(3) A filter in which the number of input variables is a multiple of the number of cylinders of the internal combustion engine 10 is used as the low-pass filter used in the processes of S92, S96, S112, and S116. Accordingly, the gain of the frequency component which is a multiple of the appearance frequency of the compression top dead center can be set to "1" and the difference in the phase characteristics can be decreased.

(4) A filter that outputs a simple moving average value of values of the variables in one combustion cycle is used as the low-pass filter used in the processes of S92, S96, S112, and S116. Accordingly, the gain of the frequency component which is a multiple of the frequency of the 0.5th-order rotation can be set to "1" and the difference in the phase characteristics can be decreased.

(5) When the absolute value of the torsion angle θdampb[0] or the absolute value of the average torsion angle θdamp720 is greater than the threshold value eth, the torsion angles θdampb[1], θdampb[2], . . . are initialized. Accordingly, even when the absolute value of the torsion angle θdampb increases to a certain extent because the low-frequency component could not be completely removed by the low-pass filter process, it is possible to resolve such a situation.

(6) When the absolute value of the torsion speed component ωrb[0] or the absolute value of the average speed component ωr720 is greater than the threshold value ωth, the torsion speed components ωrb[1], ωrb[2], . . . , are initialized. Accordingly, even when the absolute value of the torsion speed component ωrb increases to a certain extent because the low-frequency component could not be completely removed by the low-pass filter process, it is possible to resolve such a situation.

Correspondence

The correspondence between the elements in the aforementioned embodiment and the elements of the present disclosure described in the "SUMMARY" is as follows. In the following description, the correspondence is described for each number of the configurations described in the "SUMMARY." (1) and (2) The changing process corresponds to the process of S22, and the random misfire determining process corresponds to the processes of S38a, S40, S42a, S44a. S46a, S48a, and S52a. The fluctuation amount calculating process corresponds to the processes of S36 and S60 to S80. The instantaneous speed variable corresponds to the time T30. The rotational fluctuation amount corresponds to the rotational fluctuation amount ΔT30. The filter process corresponds to the processes of S68 and S72. The first process corresponds to the processes of S36, S60 to S72, S74, and S76. The second process corresponds to the processes of S36, S60, and S80. (3) The consecutive misfire determining process corresponds to the processes of S38 to S48 and S52. (4) The torsional-rigidity member corresponds to the damper 48. The crank-side acquisition process corresponds to the process of S60. The rear-side acquisition process corresponds to the process of S64. The torsion component calculating process corresponds to the processes of S66 to S72. (5) The filter process corresponds to the process of calculating a moving average value of 24 values in the processes of S92, S96, S112, and S116. (6) The stopping process corresponds to the process of S22.

Other Embodiments

The aforementioned embodiment can be modified as follows. The aforementioned embodiment and the following modified examples can be combined unless technical conflictions arise.
"Instantaneous Speed Variable"

In the aforementioned embodiment, a crank angle area in which an instantaneous speed variable which is a variable indicating the rotation speed of the crank shaft 26 is defined in the crank angle area equal to or less than an interval between the compression top dead centers is set to 30°CA, but the applicable embodiment is not limited thereto. For example, the crank angle area may be 10°CA or may be the interval between the compression top dead centers.

The instantaneous speed variable is not limited to a quantity having the dimension of time, but may be, for example, a quantity having the dimension of speed.
"Rotational Fluctuation Amount"

In the aforementioned embodiment, the rotational fluctuation amount ΔT30 is defined as a difference between the instantaneous speed variables which are separated by 120°CA, but the applicable embodiment is not limited thereto. For example, the rotational fluctuation amount ΔT30 may be defined as a difference between the instantaneous speed variables separated by 90°CA.

In the aforementioned embodiment, a pair of instantaneous speed variables which is used to calculate the rotational fluctuation amount employs variables which are separated by the same angle area for determination of consecutive misfires and for determination of a random misfire, but the applicable embodiment is not limited thereto. That is, for example, the rotational fluctuation amount ΔT30 for determination of consecutive misfires may be defined as "T30[0]-T30[3]" and the rotational fluctuation amount ΔT30 for determination of random misfires may be defined as "T30[0]-T30[4]."

The rotational fluctuation amount is not limited to a difference between the instantaneous speed variables, and may be a ratio between the instantaneous speed variables.
"Temporary Determination Process"

The temporary determination process is not limited to the configuration using a difference between the rotational fluctuation amounts ΔT30 separated by 360°CA or 720°CA. In brief, accuracy of temporary determination can be prevented from decreasing due to tolerance of the toothed portions 42 of the crank rotor 40 by using the difference between rotational fluctuation amounts ΔT30 separated by a multiple of 360°CA.

The temporary determination process is not limited to a configuration based on a result of comparison between the difference between the rotational fluctuation amounts ΔT30 separated by a multiple of 360°CA and a threshold value, but a process of directly comparing the rotational fluctuation amount of a determination target cylinder and a threshold value may be employed.
"Stopping Process"

The stopping process is not limited to the regeneration process. For example, the stopping process may be a process of stopping supply of fuel to some cylinders in order to adjust the output power of the internal combustion engine 10. For example, the stopping process may be a process of stopping combustion control in a certain cylinder when an abnormality has occurred in the cylinder. For example, the stopping process may be a process of performing control such that combustion control of only one cylinder is stopped and the air-fuel ratio of the air-fuel mixture in the other cylinders is set to the stoichiometric air-fuel ratio when the oxygen storage capacity of the three-way catalyst 32 is equal to or less than a stipulated value.
"Integral Element"

in the aforementioned embodiment, trapezoidal approximation is exemplified as the integral element in the process of S94, but the applicable embodiment is not limited thereto. For example, a process of adding the product of the newest difference speed ωdamp[0] and a time interval every time may be employed.

In the aforementioned embodiment, trapezoidal approximation is exemplified as the integral element in the process of S114, but the applicable embodiment is not limited thereto. For example, a process of adding the product of a value obtained by dividing the inertia coefficient J by the newest torsion torque Tdamp[0] and a time interval every time may be employed.
"Filter Process"

in the aforementioned embodiment, the values of the variables input to the filter process are calculated every 30°CA, but the applicable embodiment is not limited thereto. For example, the values of the variables may be calculated every 10°CA which is a 1/integer of 180°CA, or may be calculated, for example, every 60°CA. The applicable embodiment is not limited thereto. Here, the values of the variables input to the low-pass filter process are preferably calculated every 1/integer of an appearance interval of the compression top dead center.

In the aforementioned embodiment, time-series data in one combustion cycle of the values of the variables calculated every 1/integer of the appearance interval of the compression top dead center is used as an input of the low-pass filter process, but the applicable embodiment is not limited thereto. For example, time-series data in two combustion cycles may be used as an input of the low-pass filter process. Accordingly, the gain and the phase at a frequency which is a multiple of the 0.5th-order rotation can be arranged. Using the time-series data in a multiple of one combustion cycle as an input of the low-pass filter process is not necessarily performed. For example, when resonance appears at only a frequency equal to or higher than the frequency of the first-order rotation, time-series data in two strokes may be used as an input of the low-pass filter process.

In the aforementioned embodiment, the numbers of variables used as an input of the low-pass filter used in the processes of S92, S96, S112, and S116 are set to the same, but the applicable embodiment is not limited thereto. For example, the number of variables used as an input of the low-pass filter used in the processes of S112 and S116 may be set to 24, and the number of variables used as an input of the low-pass filter used in the processes of S92 and S96 may be set to 12. In this case, the values of the variables input to the low-pass filter used in the processes of S92 and S96 are preferably calculated every 1/integer of the appearance interval of the compression top dead center.

In the aforementioned embodiment, time-series data in one combustion cycle which is a predetermined period common to the values of variables calculated every 1/integer of the appearance interval of the compression top dead center in the processes of S92, S96, S112, and S116 is used as an input of the low-pass filter process, but the applicable embodiment is not limited thereto. For example, time-series data in one combustion cycle may be used as an input of the low-pass filter process in the processes of S112 and S116, and time-series data in two combustion cycles may be used as an input of the low-pass filter process in the processes of S92 and S96.

In the aforementioned embodiment, the low-pass filter processes in the processes of S92, S96, S112, and S116 are set as a simple moving average process, but the applicable embodiment is not limited thereto. For example, a simple moving average process may be used in the processes of S112 and S116, and an index moving average process may be used in the processes of S92 and S96.

In at least one of the processes of S92, S96, SI 12, and S116, the simple moving average process is not necessarily used, but an arbitrary finite response type filter may be used.

The filter process is not limited to a process using a filter in which the gain at the frequencies of the 0.5th-order rotation and the first-order rotation are "1" and phases thereof are arranged. For example, a filter in which the gain at the frequency of the 0.5th-order rotation is "1" and the phases of the 0.5th-order rotation and the first-order rotation are not arranged may be used. Such a filter is effective to enhance accuracy of determination of a misfire, for example, when the gear shift mechanism 60 is not provided and the number of resonance frequencies serving as factors for decreasing the accuracy of detection of a misfire is one as described in "Vehicle" described below. The gain at the frequency of which the 0.5th-order rotation and harmonics thereof may match the resonance frequency is not necessarily "1," but may be greater than "1." in this case, the torsion speed component ωr can be calculated using a frequency component selectively transmitted by the filter process, the phase of a speed component from which the torsion speed component ωr is to be subtracted can be adjusted, or the torsion speed component ωr can be multiplied by a correction coefficient.

The filter process is not limited to a configuration using the low-pass filter, but may use a high-pass filter. In this case, the frequency component of the 0.5th-order rotation or harmonics thereof can be selectively transmitted and the input of the integral element can be set to a value of a variable on which a filter process has been performed. That is, in this case, the process of removing the low-frequency component may not be performed by the integral element.

"Physical Model"

In the aforementioned embodiment, a model in which the elasticity coefficient K and the inertia coefficient J are set to fixed values is exemplified as the physical model for calculating the torsion speed component ωr, but the applicable embodiment is not limited thereto. For example, by setting the elasticity coefficient K to be greater when the absolute value of the torsion angle θdamp is large than when the absolute value of the torsion angle θdamp is small, the elasticity coefficient K may be set to vary depending on the torsion angle θdamp.

The physical model for calculating the torsion speed component ωr is not limited to a model including only the elasticity coefficient K and the inertia coefficient J. For example, a model in which a sum of a term including a product of a viscosity coefficient and a difference speed ωdamp and a term including a product of the torsion angle θdamp and the elasticity coefficient K is used as the torsion torque Tdamp may be used.

"Calculation Process"

The low-pass filter process may not be necessarily performed in all the processes of S92, S96, S112, and S116. For example, the low-pass filter process may be performed in only the process of S116 and may not be performed in the other processes.

In the aforementioned embodiment, the comb filter process is performed in both the processes of S104 and S124, but the applicable embodiment is not limited thereto. For example, the process of S124 may be performed and the process of S104 may be deleted. The comb filter process may not be necessarily performed.

"Reflection of Misfire Determination Result"

In the aforementioned embodiment, when it is determined that a misfire has occurred, the notification process using the warning lamp 10) is performed, but the notification process is not limited to a process of operating a device that outputs visual information, but may be a process of operating, for example, a device that outputs auditory information.

The misfire determination result may not be necessarily used for the notification process. For example, when a misfire has occurred, a process of operating an operation unit of the internal combustion engine 10 may be performed to change control of the internal combustion engine 10 to an operation state in which a misfire is not likely to occur. The misfire determination result has only to be reflected in the process of coping with a misfire by operating a predetermined hardware means.

"Changing Process"

The changing process is not limited to a configuration including the stopping process. For example, so-called dither control in which an air-fuel ratio of an air-fuel mixture in some cylinders of a plurality of cylinders is set to be richer than the stoichiometric air-fuel ratio and an air-fuel ratio of an air-fuel mixture in the other cylinders is set to be leaner than the stoichiometric air-fuel ratio may be employed. That is, for example, when the air-fuel ratio of an air-fuel mixture in cylinder #1 is set to be richer than the stoichiometric air-fuel ratio and the air-fuel ratio of an air-fuel mixture in cylinders #2 to #4 is set to be leaner than the stoichiometric air-fuel ratio, an amount of combustion energy increases periodically once in one combustion cycle. Accordingly, the same instantaneous speed variable as when the stopping process is performed can be effectively used to determine random misfires.

"Estimation of Deposition Amount"

The process of estimating the deposition amount DPM is not limited to the process illustrated in FIG. 2. For example, the deposition amount DPM may be estimated based on a difference in pressure between upstream and downstream of the GPF 34 and the amount of intake air Ga. Specifically, the deposition amount DPM can be estimated as a larger value when the different in pressure is great than when the difference in pressure is small, and the deposition amount DPM can be estimated as a larger value when the amount of intake air Ga is small than when the amount of intake air Ga is large even if the difference in pressure is the same. Here, when the pressure downstream from the GPF 34 is considered as a fixed value, the pressure of exhaust gas Pex can be used instead of the difference in pressure.

"Torsional-Rigidity Member"

The torsional-rigidity member is not limited to the damper 48. For example, when the crank shaft 26 of the internal combustion engine 10 is connected to the gear shift mechanism via a torque converter and the torque converter includes a lock-up clutch as described in "Vehicle" described below, the lock-up clutch may be used as the torsional-rigidity member. That is, in this case, the lock-up clutch has higher torsional rigidity than the damper 48, but both have no difference in causing a reaction force against torsion.

"Post-Processing Device"

The post-processing device is not limited to a device including the GPF 34 downstream from the three-way catalyst 32 and may employ, for example, a configuration in which the three-way catalyst 32 is provided downstream from the GPF 34. The post-processing device is not limited to the configuration including the three-way catalyst 32 and the GPF 34. For example, only the GPF 34 may be provided. For example, when the post-processing device includes only the three-way catalyst 32, it is effective to perform the processes described in the aforementioned embodiment or the modified examples thereof when it is necessary to increase the temperature of the post-processing device at the time of performing of the regeneration process. When the post-processing device includes the three-way catalyst 32 and the GPF 34, the GPF 34 is not limited to a filter carrying a three-way catalyst and may include only a filter.

"Control Device"

The control device is not limited to a control device including a CPU 72 and a ROM 74 and performing software processes. For example, a dedicated hardware circuit such as an ASIC that performs at least some of the software processes which have been performed in the aforementioned embodiment may be provided. That is, the control device may have at least one of the following configurations (a) to (c): (a) A configuration in which a processor that performs all the processes in accordance with a program and a program storage device such as a ROM that stores the program are provided; (b) A configuration in which a processor that performs some of the processes in accordance with a program, a program storage device, and a dedicated hardware circuit that performs the other processes are provided, and (c) A configuration in which a dedicated hardware circuit that performs all the processes is provided. Here, the number of software executing devices including a processor and a program storage device or the number of dedicated hardware circuits may be two or more.

"Internal Combustion Engine"

The number of cylinders in the internal combustion engine is not limited to four, but may be, for example, six or eight.

The internal combustion engine may not necessarily include the port injection valve 16 and the cylinder injection valve 22.

The internal combustion engine is not limited to a spark ignition type internal combustion engine such as a gasoline engine, but may be, for example, a compression ignition type internal combustion engine using diesel as fuel.

"Vehicle"

The gear shift mechanism 60 may not be necessarily provided in FIG. 1. The vehicle is not limited to a series/parallel hybrid vehicle and for example, a parallel hybrid vehicle or a series hybrid vehicle may be employed. The vehicle is not limited to a hybrid vehicle but may be, for example, a vehicle including only an internal combustion engine 10 as a power generator for the vehicle. In this case, the vehicle may include a torque converter in which a lock-up clutch is provided between the internal combustion engine 10 and the gear shift mechanism.

What is claimed is:

1. A misfire detection device for an internal combustion engine, the misfire detection device being applied to an internal combustion engine including a plurality of cylinders, a crank shaft of the internal combustion engine being connected to a torsional-rigidity member, the misfire detection device being configured to perform:

a changing process of periodically changing an amount of combustion energy of the internal combustion engine in a period of 0.5th-order rotation of the crank shaft;

a random misfire determining process of receiving a rotational fluctuation amount of the crank shaft as an input and determining that random misfires have occurred when a proportion at which misfires have occurred in a random misfire determination period is equal to or greater than a predetermined proportion; and a fluctuation amount calculating process of calculating the rotational fluctuation amount based on a crank signal, wherein the rotational fluctuation amount is a rate of change of an instantaneous speed variable, wherein the instantaneous speed variable is a variable indicating a speed when the crank shaft rotates, wherein the fluctuation amount calculating process includes a first process of calculating the rotational fluctuation amount selectively using at least one component of a frequency of 0.5th-order rotation of the crank shaft and a frequency of harmonics thereof by using a filter process, and a second process of calculating the rotational fluctuation amount without using the filter process, wherein the random misfire determining process includes a selection process of employing the rotational fluctuation amount calculated in the second process when the changing process is not being performed and employing the rotational fluctuation amount calculated in the first process when the changing process is being performed, and wherein the changing process includes a stopping process of stopping combustion control in some cylinders out of the plurality of cylinders.

2. The misfire detection device for an internal combustion engine according to claim 1, wherein the first process includes:

a crank-side acquisition process of acquiring a crank-side speed variable which is the instantaneous speed variable of the crank shaft; and a rear-side acquisition process of acquiring a rear-side speed variable which is the instantaneous speed variable on a side of the torsional-rigidity member opposite to the crank shaft side, and wherein the first process is a process of receiving a difference between the crank-side speed variable and the rear-side speed variable as an input and calculating the rotational fluctuation amount based on a result obtained by removing a torsion speed component which is a component due to torsion of the torsional-rigidity member from the crank-side speed variable and is a process of using the filter process to calculate the torsion speed component.

3. The misfire detection device for an internal combustion engine according to claim 2, wherein the first process includes:

a torsion component calculating process of receiving the difference between the crank-side speed variable and the rear-side speed variable as an input and calculating a torsion speed component which is a component due to torsion of the torsional-rigidity member in the crank-side speed variable based on a physical model; and a process of calculating the rotational fluctuation amount based on a determination speed variable which is the instantaneous speed variable of the crank shaft from which the torsion speed component has been removed, and wherein the torsion component calculating process is a process of performing the filter process on a variable which is handled by the physical model.

4. The misfire detection device for an internal combustion engine according to claim 1, wherein the misfire detection device is configured to perform a consecutive misfire determining process of receiving the rotational fluctuation amount as an input and determining that consecutive misfires have occurred in a specific cylinder out of the plurality of cylinders when a proportion at which misfires have occurred in the specific cylinder in a consecutive misfire determination period is equal to or greater than a stipulated proportion, and wherein the consecutive misfire determining process receives the rotational fluctuation amount calculated in the first process as an input.

5. The misfire detection device for an internal combustion engine according to claim 1, wherein the filter process includes a process using a filter with the number of the input variables set to a multiple of the number of cylinders of the internal combustion engine.

\* \* \* \* \*